Figure 1:
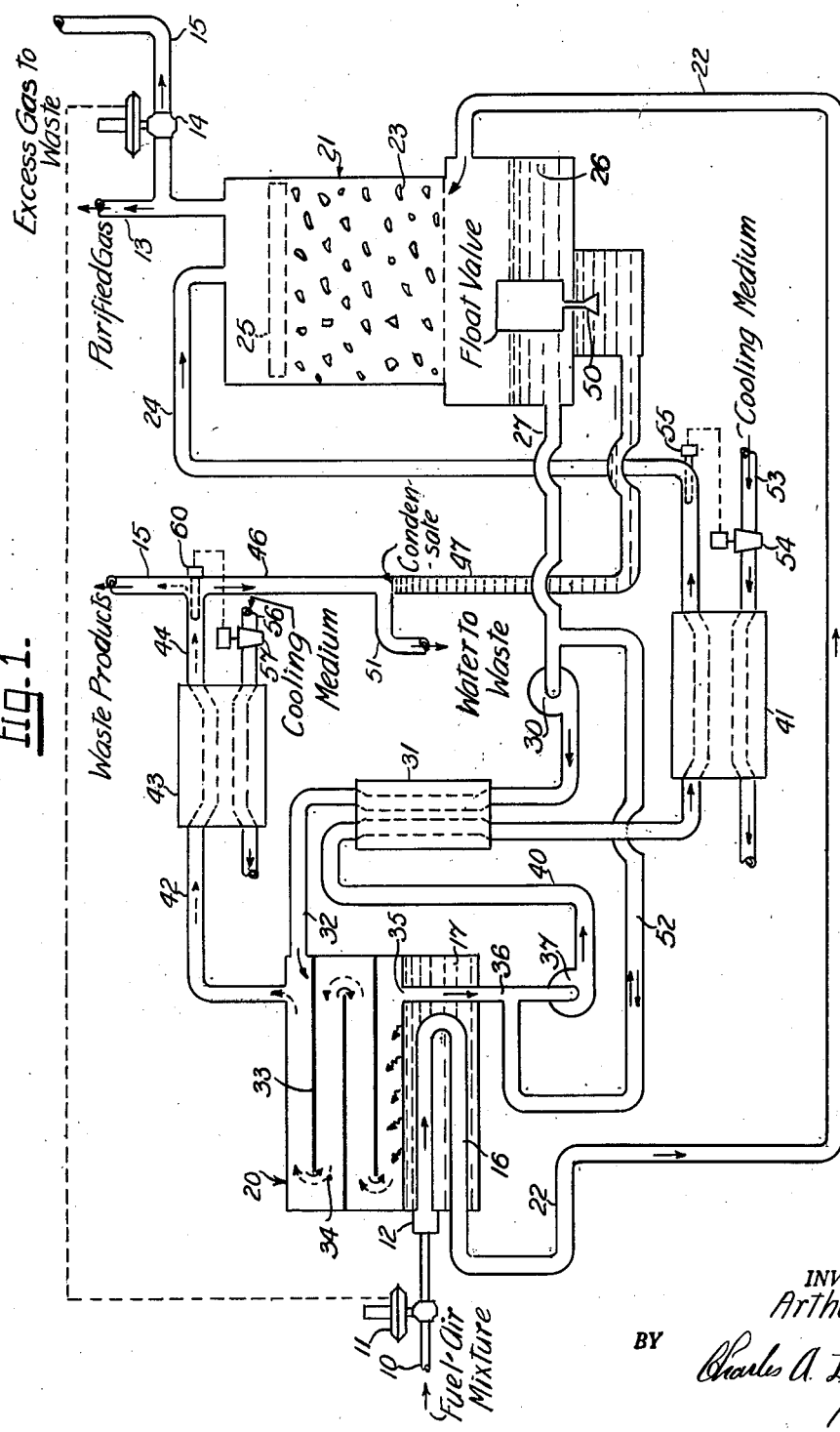

April 14, 1953  A. W. PETERS  2,635,039
APPARATUS FOR PURIFYING PRODUCTS OF COMBUSTION
Filed Sept. 3, 1948  2 SHEETS—SHEET 2

INVENTOR.
Arthur W. Peters
BY
Charles A. Lind
Attorney

Patented Apr. 14, 1953

2,635,039

UNITED STATES PATENT OFFICE 2,635,039

APPARATUS FOR PURIFYING PRODUCTS OF COMBUSTION

Arthur W. Peters, Toledo, Ohio, assignor to Surface Combustion Corporation, Toledo, Ohio, a corporation of Ohio Application September 3, 1948, Serial No. 47,683

5 Claims. (Cl. 23—260)

This invention relates to an improved method and apparatus for purifying gases by removing certain components such as $CO_2$ from a gas mixture by absorbing them in a liquid that absorbs these components under certain conditions and liberates them under other conditions.

As disclosed in Patent No. Re. 18,958, numerous absorbing solutions are known to the art, and can be used in the practice of the invention. The preferred absorbing solutions are water solutions of the ethanolamines, the most desirable being monoethanolamine. A water solution that contains about 10 weight per cent of monoethanolamine is particularly advantageous in that under preferred operating conditions it is highly efficient in absorbing carbon dioxide.

Heretofore, it has been known that gas purification can be effected by passing the gas to be purified in intimate contact with an absorbing solution in a contact tower hereinafter usually referred to as an absorber, and that the absorbed components can be liberated by heating the absorbing solution in a stripper. The processing of the absorbing solution to release the absorbed components has the effect of regenerating the absorbing solution, which can then be recycled for further use in the absorber. This permits the use of a closed system of operation where the absorbing solution is recirculated indefinitely without appreciable loss.

One method that has been used to heat the absorbing solution to release the absorbed components employs steam or electricity as the heating medium. This method permits the use of simple controls since the usual practice is to utilize a constant heat input regardless of the rate of flow of the gas to be purified. However, the method is not economical in operation since, if the gas to be purified is generated by burning a fuel, the heat of combustion is lost at the expense of using cooling water. The steam or electricity must replace this lost heat and additional cooling water must be used to dissipate the heat added. Furthermore, the heat applied in the form of steam or electricity is maintained at maximum requirements even when the rate of gas purification is materially reduced.

In cases where a fuel is burned to generate the gas to be purified, it has been recognized that it is desirable to utilize the heat of combustion of the fuel to release the absorbed components from the absorbing solution because it results in greater economy of operation due to a saving in steam or electricity and cooling water. A further economy measure is imposed by a requirement of industry that the equipment be capable of operation at rated capacity and at rates considerably below rated capacity or at any rate between capacity rating and minimum capacity. Furthermore, a desideratum is that the equipment should automatically maintain its balance and efficiency at any rate within its range of turn-down and while changing from one rate to another. Equipment so utilizing the heat of combustion of the fuel has been used but such equipment depends upon a multiplicity of complex controls and instrumentation to maintain it in balance.

Several characteristics of the gas purification process contribute to the complexity of controls required by the equipment heretofore known. For example, the gas mixtures that are purified commercially are frequently generated by the combustion of natural gas with air, and the absorbing solution is usually a water solution (frequently of an ethanolamine); therefore, the amount of water vapor in the gas to be purified depends upon the humidity of the air with which the fuel gas is burned, and upon the rate at which a fuel gas containing hydrogen is being burned. As a consequence, water is added to the absorbing solution in varying amounts during operation and part of the control system on such automatic purifiers must include a method for regulating the amount of such condensed water retained by the absorbing solution so that the amount and concentration of the latter may remain approximately constant. Furthermore, when the heat of combustion of the fuel gas is used to heat the absorbing solution to strip the absorbed components, a variation in the rate of flow of fuel gas (used to vary the output of finished gas) results in a variation in the heat available to strip the absorbed components from the absorbing solution. Some provision must, therefore, be made to compensate automatically for variations in the heat available to strip the absorbed components from the absorbing solution. Methods heretofore known for using water solutions to remove components of a gas mixture either require elaborate control devices to achieve nearly automatic operation, or cannot be adapted to utilize the heat of combustion of the fuel gas (used to generate the gas mixture) to release the absorbed components in the stripper.

The principal object of the invention is to provide an improved method and apparatus readily adapted to simple automatic control, for purifying gases by removing certain components from products of combustion by absorbing these components in an absorbing solution, and then releasing these components from the absorbing solution by utilizing the heat of combustion of the fuel which is used to generate said products of combustion. This particular arrangement of gas purifying equipment has the advantage that it returns distilled water to the absorbing solution and thus avoids contamination of the solution; at the same time, the method avoids the necessity of distilling water to be used as "make up" water. The method further avoids the necessity for either complicated control equipment or an independent heat source.

The invention is particularly well adapted to the recovery of nitrogen from a burned mixture of fuel gas and air and will be described in that connection.

For a consideration of what I consider to be novel and my invention, attention is directed to the following specification and the claims appended thereto.

Figure 2:
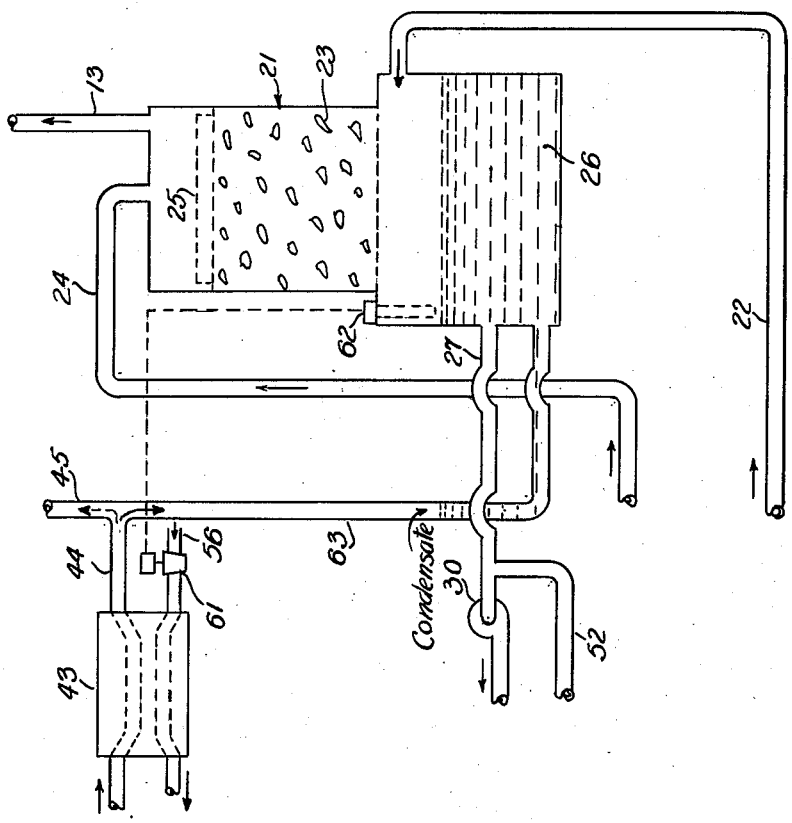

In the drawings,

Fig. 1 is a more or less schematic representation of the improved gas generating apparatus. Fig. 2 shows a modification of a detail embodied in Fig. 1.

A mixture of natural gas and air (in the proper proportions for substantially complete combustion) is conducted from a source of supply by a pipe 10 to a flow regulator 11 and thence to a burner 12. The flow regulator is controlled by pressure transmitted from the purified gas exit pipe 13. When the demand for purified gas is reduced the pressure in pipe 13 has a tendency to rise. Any increase in pressure in pipe 13 transmitted to the flow regulator 11 will cause the flow regulator to start to close. Conversely an increase in the demand for purified gas will cause the flow regulator to move toward its open position. The flow regulator is equipped with maximum and minimum stops. The maximum stop prevents the flow regulator from opening beyond a predetermined amount to establish a maximum capacity for gas flow even if the pressure in pipe 13 should be materially reduced. The minimum stop prevents the flow regulator from closing beyond a predetermined amount to establish a minimum capacity below which the equipment is not designed to operate. When the actual demand for purified gas is less than the designed minimum rate the difference between the designed minimum rate and the actual demand flows through the vent regulator 14, thence through pipe 15 to a vent. The vent regulator is controlled by pressure transmitted from the purified gas exit pipe 13 in such a manner that when the actual demand for purified gas is below the designed minimum the flow regulator 11 will have assumed its minimum open position thus causing the pressure in pipe 13 to rise and the vent regulator to open. The vent regulator is usually set to open at a pressure of 1 to 2 inches water column above the normal operating pressure. In this manner the equipment will deliver purified gas at approximately constant pressure at any rate of demand up to its rated capacity. The equipment can be designed to operate at any desired delivery pressure although the usual delivery pressure desired is between 10 and 40 inches of water column.

The combustion products from the burner 12 consists substantially of nitrogen (essentially from the air), carbon dioxide (from the carbon constituent of the natural gas) and water vapor (in large part from the hydrogen constituent of the natural gas, also from the moisture content of the air used). The oxygen content of the air is entirely eliminated by combination with the combustible constituents of the natural gas. The carbon dioxide is absorbed by contact with the absorbing solution (usually a 10 to 15 weight per cent water solution of monoethanolamine) and the major part of the water vapor is condensed by contact with the absorbing solution. The amount of water vapor remaining in the purified gas depends on the temperature at which the absorbing solution enters the absorber since the purified gas leaves the absorber saturated with water vapor at approximately the same temperature as that at which the absorbing solution enters (usually about 100° F.).

The combustion products from the burner 12 pass directly into a tube or multiplicity of tubes 16 submerged in a body of absorbing solution 17 contained in the lower part of the stripper generally indicated at 20. The tube 16 serves as a heat exchanger wherein the hot combustion products are cooled to a temperature of about 300° F. the coolant being the absorbing solution 17. The transfer of heat maintains this absorbing solution in a boiling condition at a temperature of about 215° F. This boiling action releases the carbon dioxide that has been absorbed into the absorbing solution in the absorber or contact tower generally indicated at 21 together with a large volume of water vapor. (This mixture of carbon dioxide and water vapor leaving the surface of the boiling absorbing solution 17 is hereinafter termed "stripped components.")

The cooled combustion products leaving tube 16 pass through a pipe 22 into the lower part of the absorber tower 21 which is a gas tight container filled with a packing material such as Beryl saddles or Raschig rings 23. Absorber feed flows through a pipe 24 to the top of the absorber and is distributed over the packing material by a distributor such as a pervious pan 25. ("Absorber feed" is used herein to define the fresh absorbing solution which has been treated in the stripper 20 for removal of carbon dioxide and water and which flows into the top of the absorber tower 21.) As the combustion products flow upward through the absorber 21 they are contacted by the downward flowing absorbing solution with the result that substantially all of the carbon dioxide and the major portion of the water vapor are absorbed from the combustion products into the absorbing solution and essentially pure nitrogen flows from the absorber through the pipe 13.

The absorbing solution laden with carbon dioxide and water vapor (hereinafter termed "absorber bottoms") flows from the bottom of the absorber 21 and passes into a sump 26. From the sump the absorber bottoms flow by gravity through a pipe 27 to a pump 30 which pumps them through a heat exchanger 31 (the heating medium being hot absorbing solution that leaves the stripper) thence through a pipe 32 to the upper portion of the stripper 20. The upper portion of the stripper contains a series of plates 33 and passages 34 between the plates. The absorbing solution discharged from the pipe 32 (hereinafter termed "stripper feed") into the upper portion of the stripper 20 flows by gravity across the top plate and then spills onto the second plate across which it then flows before spilling onto subsequent plates. From the bottom plate in the upper portion of the stripper the absorbing solution spills into the boiling absorbing solution 17 in the stripper. The stripped components leaving the absorbing solution 17 pass upward through the passages 34 where they contact the stripper feed flowing across the plates 33. This contact effects heat transfer whereby the stripped components are cooled and water vapor condensed therefrom, and the stripper feed is heated to approximately its boiling temperature before it spills into the boiling absorbing solution 17. The water condensed from the stripped components flows with the stripper feed back into the hot boiling absorbing solution 17. Other methods, such as a shell and tube heat exchanger, may be used to effect the above heat transfer but the above described plate type exchanger is usually employed for reasons of simplicity and economy of construction.

The hot boiling absorbing solution 17 flows by gravity over a spillway 35, thence through a pipe 36 to a pump 37. (The hot absorbing solution leaving the stripper 20 through the pipe 36 is hereinafter termed "stripper bottoms.") The purpose of the spillway 35 is to maintain a substantially constant level of absorbing solution in the stripper and to avoid the possibility of injury to the exchange tube 16, which could be caused by overheating if any part of it were exposed above the level of the absorbing solution. The pump 37 pumps the hot absorbing solution through a pipe 40 thence through the heat exchanger 31, the cooling medium being the absorbing solution from the sump 16; thence through a water cooled heat exchanger 41 (the cooling medium being cooling water) thence through the pipe 24 to the top of the absorber as absorber feed.

Under certain conditions where an appreciable amount of carbon dioxide and water vapor can be tolerated in the purified gas and where the temperature of the absorber feed need not be lowered to its usual value of about 100° F. the cooling effect of the heat exchanger 31 will be sufficient so that heat exchanger 41 is not necessary.

The stripped components after passing through passages 34 and having lost some water vapor and some heat leave the top of the stripper as stripper heads and pass through a pipe 42 to a condenser 43. ("Stripper heads" is herein defined as the non-condensible gases saturated with water vapor that leave the stripper through pipe 42; therefore, stripper heads consist of stripped components from which some water vapor has been condensed and some heat has been extracted in the upper part of the stripper.) The stripper heads are cooled in the condenser 43 (the cooling medium being cooling water) to condense water vapor therefrom. The absorbed components pass through a pipe 44 thence to a vent 45 from which they can be discharged, or collected if they are to be utilized. ("Absorbed components" is herein defined as the non-condensible gases absorbed by the absorbing solution in the absorber, saturated with water vapor that leave the condenser.) The condensed water flows by gravity through a pipe 46 into a vertical trap 47.

Some of the condensed water which collects in the vertical trap 47 passes into the sump 26 through a float valve 50 which serves to maintain an approximately constant level of liquid in the sump (thereby keeping the amount and concentration of the absorbing solution approximately constant). After the vertical trap has filled to the level of a waste outlet pipe 51, the excess condensed water flows by gravity through said pipe and thence ordinarily to a sewer.

In the practice of the invention the pumps 30 and 37 are usually so operated that the rates of flow of absorbing solution through both pumps are substantially constant, and preferably equal, regardless of the rate of gas flow through the purifying equipment. This means that the rates of flow of the stripper feed and absorber feed will be equal and constant. However, the rate of flow of the stripper bottoms will not necessarily be equal to the rate of flow of the stripper feed, nor will the rate of flow of the absorber bottoms necessarily be equal to the rate of flow of the absorber feed. This is due to the fact that some of the stripper feed leaves the stripper in the stripper heads in the form of water vapor which is condensed in the condenser 43, and returns to the sump 26 without passing through pump 37. Therefore, the rate of flow of the stripper bottoms is usually less than the rate of the stripper feed. Likewise the rate of flow of the absorber bottoms will usually be greater than the rate of flow of the absorber feed, this difference also being increased in amount by the water vapor condensed from the combustion products in the absorber 21. Furthermore, the difference in rates of flow will not be constant throughout the range of turndown of the equipment (range of turndown being defined as that range between maximum and minimum rate of flow of fuel gas for which the equipment is designed). At high rates of flow the volume of stripped components is high, hence the volume of stripper heads is high and the amount of condensed water returned to the sump 26 is high. This is true since the rate of flow and temperature of the stripper feed are approximately constant, so that the amount of heat required to preheat the stripper heads to boiling temperature is nearly the same at any rate of flow of gas, and since at high rates more heat is transmitted to the boiling solution, this excess heat is dissipated by boiling more water vapor into the stripped components. Therefore, it is impossible to set the two rates of flow constant and avoid excessive piling up of solution in either the absorber or stripper without some means of control. This control is accomplished simply and without any instrumentation by utilizing a fixed by-pass pipe 52 which contains no valves or restrictions and which permits free and uncontrolled flow of absorbing solution in either direction between the absorber bottoms and the stripper bottoms. It is usually desirable to adjust the rates of flow of stripper feed and absorber feed so that there will be a minimum flow of absorbing solution in the by-pass pipe 52 so as to avoid contamination of stripper bottoms with absorber bottoms. At this point it may be mentioned that the difference between stripper bottoms and absorber feed is the small amount of absorbing solution that flows through pipe 52 into or out of pipe 36; and the difference between absorber bottoms and stripper feed is the small amount of absorbing solution that flows through pipe 52 into or out of pipe 27.

Heat is transferred from the combustion products to the absorbing solution flowing downward through the absorber 21 in three ways, sensible heat in cooling the combustion products, latent heat in condensing water vapor from the combustion products, and heat of reaction in the absorption of carbon dioxide from the combustion products. Usually the absorber feed in the pipe 24 is maintained at an approximately constant temperature of about 100° F. by use of the heat exchanger 41. This is done by controlling the flow of cooling water entering said heat exchanger through a pipe 53 by means of a control valve 54 which, in turn is actuated by a temperature responsive element 55 located in the absorber feed pipe 24. Under these conditions the temperature of the stripper bottoms will be about 128° F. at full flow of fuel gas and about 112° F. at one half of full flow of fuel gas. Since the rate of flow of the absorber feed is constant the temperature rise of the absorbing solution will be reduced when the flow of gas is reduced.

The only source of heat supply to the stripper 20 is by the combustion of the fuel gas at the burner 12. The heat dissipated from the boiling solution by vaporizing water constitutes 75% or more of the total heat from the fuel and comprises nearly all of the heat contained in the stripped components.

It is known that an equilibrium exists between carbon dioxide and water vapor over the boiling absorbing solution 17, and that the more water vapor that is released the more carbon dioxide will be released. Therefore, it is desirable that the stripper feed enter the boiling solution at, or near, its boiling temperature so that the maximum amount of heat can be used to produce water vapor and hence strip the maximum amount of carbon dioxide from said boiling absorbing solution. For this reason the heat in the stripped components is utilized to heat the incoming stripper feed.

A certain amount of water vapor is absorbed in the absorber 21 and this exact amount of water must be removed from the system in order to maintain constant the amount and concentration of the absorbing solution in the system. The only means of egress for this absorbed water is by way of the stripper heads. It is necessary, therefore, that the stripper heads leave the stripper 20 at a temperature sufficiently high so that the water vapor contained in the saturated carbon dioxide will not be less than that absorbed in the absorber. Where the combustion products are formed by burning natural gas this minimum temperature is found to be about 192° F. It is desirable to design the equipment so that the temperature of the stripper heads is well above this figure since the excess water can be disposed of through pipe 51. Usually the temperature of the stripper heads will be about 207° F. at full gas flow and about 198° F. at one half of full gas flow.

The difference between the heat content of the stripped components and the heat content of the stripper heads is used as described to preheat the stripper feed. If the stripper feed enters at too low a temperature this heat will not be sufficient to heat the stripper feed to its boiling temperature. Therefore, the heat interchanger 31 is utilized to transfer heat from the hot absorber feed to the stripper feed. This interchange of heat does not dissipate heat from the system but is used only to insure that the stripper feed attains a sufficiently high temperature so that stripping will proceed with its maximum efficiency. Furthermore, since the rate of flow of stripper feed is approximately constant at all rates of gas flow the heat required to heat it to its boiling point will be substantially constant. Therefore, it is necessary to design the heat interchanger 31 large enough so that the temperature of the stripper heads will be sufficiently high to satisfy the requirements at minimum flow. Usually the temperature of the stripper feed will be about 179° F. at full gas flow and about 177° F. at one half of full flow. It is obvious from the foregoing that the size of the heat interchanger 31 will determine the range of turn-down of the equipment since its size is determined by the temperature requirements of the stripper feed at minimum gas flow only. If said heat interchanger is made larger than necessary it will have the effect of increasing the heat content of the stripper heads and this excess heat can be dissipated easily in the condenser 43. The size of said heat interchanger is not critical, and having once been selected to satisfy a particular desired range of turndown it will perform its function without the use of any automatic control whatsoever. A large range of turndown will require a large heat interchanger indicating that there is an optimum size that will balance first cost of equipment against cost of operation (in those cases where the demand for purified gas sometimes falls below the minimum for which the equipment is designed). Usually the equipment is designed so that the minimum rate is one half the maximum rated capacity.

The size of the heat exchanger 41 is also determined by the desired range of turndown. Since the heat interchanger 31 transfers heat from the absorber feed to the stripper feed the temperature of the absorber feed is lowered in passing through the same. The larger this heat interchanger 31 is made the lower will be the temperature of the absorber feed leaving it. Since the temperature of the absorber feed leaving the heat exchanger 41 is fixed by the controls 54—55 the heat transfer requirements of this heat exchanger will be less for a large range of turndown than for a small range of turndown. In other words the heat discharged from the system by heat exchanger 41 in the cooling water will be large for a small range of turndown and small for a large range of turndown. In equipment designed for the usual 2 to 1 range of turndown the absorber feed will enter the heat exchanger 41 at about 157° F. when operating at full gas flow and at about 149° F. when operating on one half of full gas flow. Hence it can be seen that in given equipment, the temperature of the absorber feed entering heat exchanger 41 does not vary widely over the entire range of turndown. This means that the amount of heat to be dissipated in the cooling water does not vary widely. Furthermore, it has been found in actual practice that the temperature of the absorber feed leaving this heat exchanger 41 and entering the absorber 21 need not be held closely to any given value. It need only be prevented from exceeding a given maximum value. For these reasons the temperature control valve 54 can be eliminated and the rate of cooling water flow set by a hand valve or the like in sufficient amount so that the temperature of the absorber feed entering the absorber does not exceed a particular value. If the temperature falls below this value it does not affect the efficient operation of the process. The true function of the automatic valve 54 is, therefore, only to conserve cooling water.

As hereinbefore described, the stripper heads must contain an amount of water vapor not less than that condensed into the absorbing solution in the absorber. The actual amount of water vapor in the stripper heads is a variable and will depend on the rate of gas flow and the temperature at which the stripper feed enters the stripper. The excess water vapor in the stripper heads, over that which equals the amount absorbed in the absorber, which must be returned to the absorbing solution is condensed in the condenser 43.

The absorbed components leaving the condenser and passing out through the pipe 45 must contain an amount of water not more than that condensed into the absorbing solution in the absorber 21, otherwise more water vapor would leave the system with the absorbed components than enters with the products of combustion and the absorbing solution would decrease in amount and its concentration would rise. In order to satisfy the above condition the absorbed components must not leave the system at a temperature in excess of about 192° F. It is the usual practice to operate under conditions where the absorbed components leave the condenser at a temperature of 175° F. or less. This temperature can be maintained approximately constant by controlling the flow of cooling water that enters through a pipe 56 by means of a control valve 57 which in turn, is actuated by a temperature responsive element 60 located in the pipe 44. The heat transferred in the condenser 43 and discharged from the system in the cooling water is equal to the difference between the heat content of the stripper heads and the heat content of the absorbed components. This heat discharged from the system varies widely throughout the range of turndown. At low rates of gas flow the stripper heads are low in heat content and at high rates of gas flow the heat content of the stripper heads is high. However, the temperature at which the absorbed components are discharged from the system is of no importance provided they do not leave at a temperature above a certain maximum value. For this reason the temperature control valve 57 can be eliminated and the rate of flow of the cooling water can be set by a hand valve, or the like, in sufficient amount so that the temperature of the absorbed components can not exceed a particular value. The true function of the automatic valve 57 is then, only to conserve cooling water since the system can be maintained in heat and material balance without any automatic control or manual attention at this point.

It has been shown that the size of the heat exchanger 41 must be based on the desired range of turndown; so, likewise, the size of the condenser 43 must be based on the desired range of turndown. When the desired range of turndown is large the heat exchanger 31 must be large hence the temperature of the stripper feed will be high. This results in producing a high temperature and high heat content of the stripper heads. This, in turn necessitates a large condenser 43.

It has been shown herein that the absorbed components must not leave the system at a temperature above that maximum at which the amount of water leaving in the absorbed components will exceed the amount of water condensed from the combustion products in the absorber. It has also been stated that the absorbed components usually leave the system through the pipe 45 at a temperature somewhat below the maximum temperature indicated above. This means that an excess amount of water vapor is being condensed from the stripper heads. This in turn requires some kind of control means whereby the excess water may be discharged at another point in order to prevent the absorbing solution from gaining in volume and finally overflowing. This control comprises the vertical trap 47 and the float valve 50. The float valve is actuated by the level of the liquid in sump 26 and controls the flow of condensed water from the condenser 43 to said sump. This condensed water flows through the float valve and when the level in the sump is satisfied the float rises to throttle the valve and reduce the flow of condensed water. The condensed water excluded from the sump rises in trap 47 and flows from the system, usually to a sewer, through pipe 51. By this means the amount of absorbing solution in the system is maintained constant regardless of rate of gas flow. Also it will be noted that the absorbing solution does not become contaminated with foreign material since the condensed water that is returned to the absorbing solution is distilled from the absorbing solution itself.

Since the control described maintains constant the amount of the absorbing solution in the system it also maintains constant the concentration of absorbent in the absorbing solution. This is true since the absorbent (i. e., the active material, usually an ethanolamine) is neither added to the system or removed from the system to any appreciable extent. Therefore, the amount of absorbent in the system is approximately constant. The control above described maintains constant the amount of the solution. Therefore, if the amount of solution is maintained constant and the amount of absorbent remains constant the amount of solvent (usually water) must remain constant and so maintain a constant concentration of the absorbing solution.

One alternate method of control for maintaining constant the amount of absorbing solution in the system is shown in Fig. 2 wherein the rate of flow of cooling water to the condenser 43 is controlled by a throttling valve 61 which is actuated by an element 62 which is sensitive to changes in the level of the absorbing solution in the sump 26. The water condensed in the condenser flows by gravity to the sump through a pipe 63. If more water is being condensed from the combustion products in the absorber 21 than is being discharged with the absorbed components through pipe 45 the level in the sump will tend to rise. The element 62 will therefore cause the valve 61 to move toward closed position thus reducing the flow of cooling water to the condenser 43 and raising the temperature at which the absorbed components are discharged through pipe 45. As the temperature of the absorbed components rises more water vapor is discharged from the system thus maintaining a constant level of solution in the sump and hence a constant amount of absorbing solution in the system.

The second described control will perform all the functions and maintain the system in balance as well as the first described control. However, in practice the first described control is found to be preferable due to its simplicity and ease of manufacture.

The method and apparatus herein described has many advantages over equipment hitherto known for the purpose. Some of these advantages are listed below:

A. A fuel gas can be burned to form the gaseous mixture from which the final purified gas is made, while using the heat of combustion of the same fuel gas to perform the necessary operation of regenerating the absorbing solution and at the same time maintaining heat and material balance automatically at various rates of gas flow with an almost complete absence of automatic controls.

B. The rates of flow in the absorbing solution circuits can be maintained constant at predetermined design values and require no automatic control devices for successful operation even though the rate of gas flow varies widely.

C. The range of turndown of the equipment can be determined in advance and the sizes of the heat exchanger 41, the heat interchanger 31, and the condenser 43 can be established to meet the requirements of the desired range of turndown. Equipment, can, therefore, be designed to operate automatically at any predetermined range of turndown within reasonable limits.

D. The heat exchanger 41 need be equipped with an automatic temperature control valve only for the purpose of conserving cooling water.

E. The condenser 43 need be equipped with an automatic control valve only for the purpose of conserving cooling water.

F. The only automatic control essential to the operation of the equipment is the control for maintaining constant the amount of absorbing solution in the system. This control is conventional in type, easily obtained, simple in construction, and reliable in operation and will accurately maintain the heat and material balance of the system.

From the foregoing description it will now be seen that the present invention provides a method and apparatus that is particularly well adapted for its intended purpose; and it will be understood that no limitations are intended except as expressed in the appended claims.

What I claim as new is:

1. An apparatus for purifying products of combustion, including an absorbent circuit comprising an absorber, an absorbent return passage, a stripper, and an absorbent supply passage comprising a cooler; a combustion chamber in heat-supplying relation to the stripper; a flue leading from the combustion chamber to the absorber; a condenser; a vapor passage leading from the stripper to the condenser; a condensate return passage leading from the condenser to the absorbent circuit; a pump in the absorbent supply passage; a pump in the absorbent return passage; and an auxiliary passage leading from the intake of the first-mentioned pump and completing an alternative absorbent circuit which by-passes the portion of the absorbent supply passage that extends from said pump to the absorber.

2. An apparatus as claimed in claim 1 that comprises a heat exchanger connected in the absorbent supply passage and in the absorbent return passage to transmit heat from one passage to the other.

3. An apparatus as claimed in claim 1 that comprises a sump in the absorbent circuit and a control responsive to the liquid level in the sump for regulating the rate at which condensate is returned to the absorbent circuit through the condensate return passage.

4. An apparatus as claimed in claim 1 wherein the control responsive to the liquid level in the sump regulates the temperature of the condenser.

5. An apparatus for purifying products of combustion, including an absorbent circuit comprising an absorber, an absorbent return passage, a stripper, and an absorbent supply passage comprising a cooler; a combustion chamber in heat-supplying relation to the stripper; a flue leading from the combustion chamber to the absorber; a condenser; a vapor passage leading from the stripper to the condenser; a reservoir having an overflow; a condensate return passage leading from the condenser to the reservoir; a sump in the absorbent circuit; a float valve which is responsive to the liquid level in the sump and which connects the reservoir with the absorbent circuit; a pump in the absorbent supply passage; a pump in the absorbent return passage; and an auxiliary passage leading from the intake of the first-mentioned pump and completing an alternative absorbent circuit which by-passes the portion of the absorbent supply passage that extends from said pump to the absorber.

ARTHUR W. PETERS.

References Cited in the file of this patent

UNITED STATES PATENTS

| Number | Name | Date |
| --- | --- | --- |
| 68,321 | Stevens | Aug. 27, 1867 |
| 160,703 | Painter | Mar. 9, 1875 |
| 740,700 | Schutz | Oct. 6, 1903 |
| 1,044,531 | Hunter | Nov. 19, 1912 |
| 1,119,004 | Drewsen | Dec. 1, 1914 |
| 1,287,472 | Shoeld | Dec. 10, 1918 |
| 1,289,496 | McCourt | Dec. 31, 1918 |
| 1,541,175 | Ostromislensky | June 9, 1925 |
| 2,042,665 | Kinzel | June 2, 1936 |
| 2,048,656 | Hunt | June 21, 1936 |
| 2,188,321 | Swanson et al. | Jan. 30, 1940 |
| 2,314,827 | Hortvet | Mar. 23, 1943 |

FOREIGN PATENTS

| Number | Country | Date |
| --- | --- | --- |
| 25,629 | Great Britain | 1912 |

OTHER REFERENCES

Hackh's Chemical Dictionary, 2nd ed., page 906. P. Blakiston's Son and Co., Inc., Philadelphia.